United States Patent Office 3,212,116
Patented Oct. 19, 1965

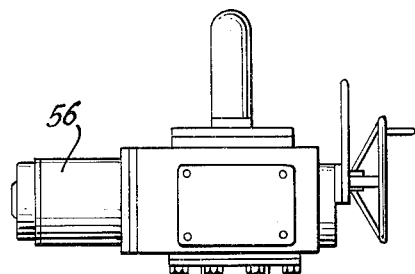
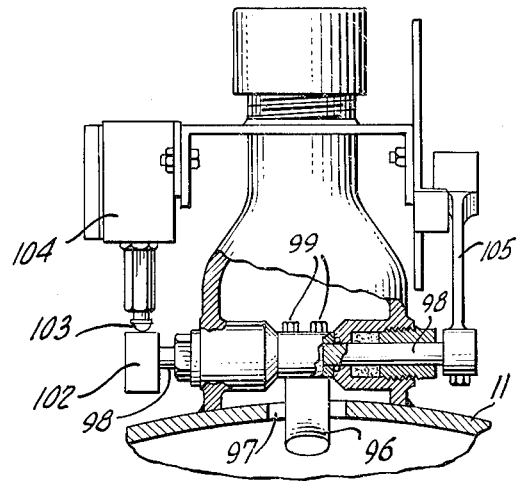
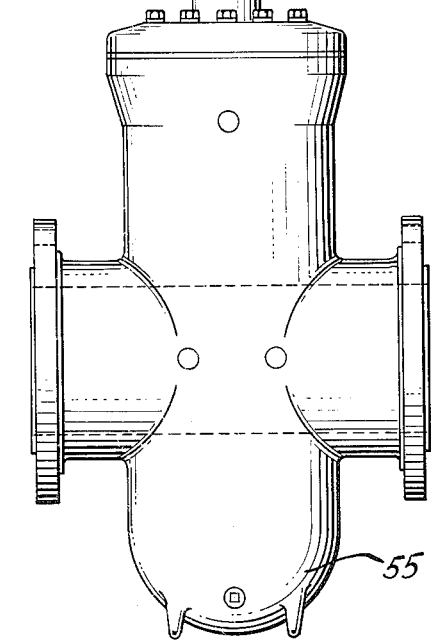
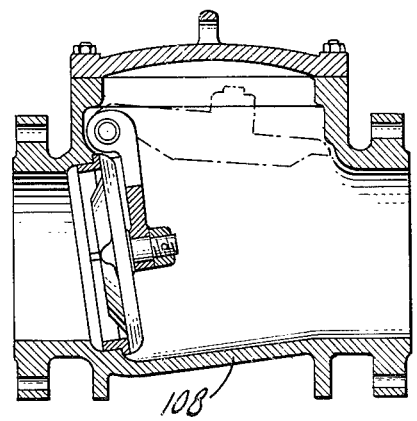

3,212,116
PIPELINE SCRAPER-PASSING SYSTEM
John W. Gentry, Jr., Dobbs Ferry, N.Y., assignor to The Texas Pipe Line Company, Houston, Tex., a corporation of Texas
Filed May 1, 1963, Ser. No. 277,245
6 Claims. (Cl. 15—3.5)

This invention concerns a system for a pipe line operation. More specifically, the invention concerns an operation related to the passing of a scraper through a pipe line past a pumping station, without subjecting the pumping station to debris that has been scraped free in conjunction with the scraper passing along in the pipe line.

Prior to this invention there have been arrangements for receiving a scraper at a pumping station and then reinserting same for continuing passage down the pipe line. However, such arrangements necessitated the manual removal of the scraper and reinsertion thereof for continuing the scraping operation on downstream. Consequently, there was no automatic provision for receiving and passing along a scraper at an unattended pumping or booster station. Furthermore, even if some arrangement had been made whereby the scraper could be bypassed around the pump of a booster station, this would not have avoided having the debris that had built up ahead of the scraper from being carried through the pump with consequent extra wear and damage to the mechanical seals by reason of the nature of such dirt, sand, welding splatter, paraffin and other debris.

Another object of the invention is to provide a system that is particularly adapted for use with an unattended pumping station, and that provides for the passing of a scraper along with all accumulated debris without any of the debris or the scraper going through the pump itself.

Another object of the invention is to provide a pumping station with a loop structure connected to the pipe line. The arrangement being such that the arrival of a scraper may be detected at the upstream end of the loop, and the pipe line connections to the pumping station may then be switched from the downstream end of the loop to the upstream end, above the scraper. In this manner the scraper and accumulated debris is allowed to pass through the loop and on down the line. Then, upon detection of the scraper at the downstream end of the loop, the pumping station connections may be switched back to the downstream end to await arrival of the next scraper.

Briefly, the invention may be described as one applicable to pipe line operations involving a pumping station. The invention comprises a system for passing a scraper without subjecting the pumping station to scraper accumulated debris. Such system provides means for sensing the arrival of said scraper upstream from said station at a distance great enough to prevent any debris from entering the station, and switching the inlet for said station to a location upstream from said scraper. The system provides means for switching the outlet for said station to a location upstream from said scraper, sensing the passage of said scraper downstream from the original location of the outlet before said first named sensing of the scraper, and switching the inlet and outlet from said station back to the original locations to be ready to pass another scraper.

Again briefly, the invention is applicable to an automatic pumping station of a pipe line which has means for passing a scraper without flowing any scraper debris through the pump. The invention comprises a pipe line having a loop adjacent to said station, an inlet line to said station and an outlet line from said station. It also comprises a first pair of motor driven valves having one side connected to branches of said inlet line, and a second pair of motor driven valves having one side connected to branches of said outlet line. The other side of said pairs of valves are connected respectively to said pipe line near the upstream and downstream ends of said loop. The invention also comprises a first signal indicator located near the upstream end of said loop in said pipe line for indicating passage of a scraper, and a second signal indicator located near the downstream end of said loop for detecting passage of the scraper. The invention also comprises control means actuated by said indicators for causing one of each of said first and second pair of valves to open and the other of each pair to close in order to shift said inlet and outlet lines from a downstream location relative to said scraper to an upstream location relative thereto.

The foregoing and other objects and benefits of the invention will be more fully appreciated in connection with a particular embodiment that is set forth by way of illustration, and that is illustrated in the drawings wherein:

FIGURE 3 is a side elevation illustrating a typical motor operated valve, such as may be employed in the various switching control valves of the system;

FIGURE 4 is a side elevation partly broken away in cross-section, with the view taken transversely of the pipe line, showing a typical scraper signal indicator device; and FIGURE 5 is a longitudinal cross-section view illustrating a typical check valve which may be used in the required locations of the pipe line including separating the inlet and outlet connections to the line from the pumping station.

Figure 1:
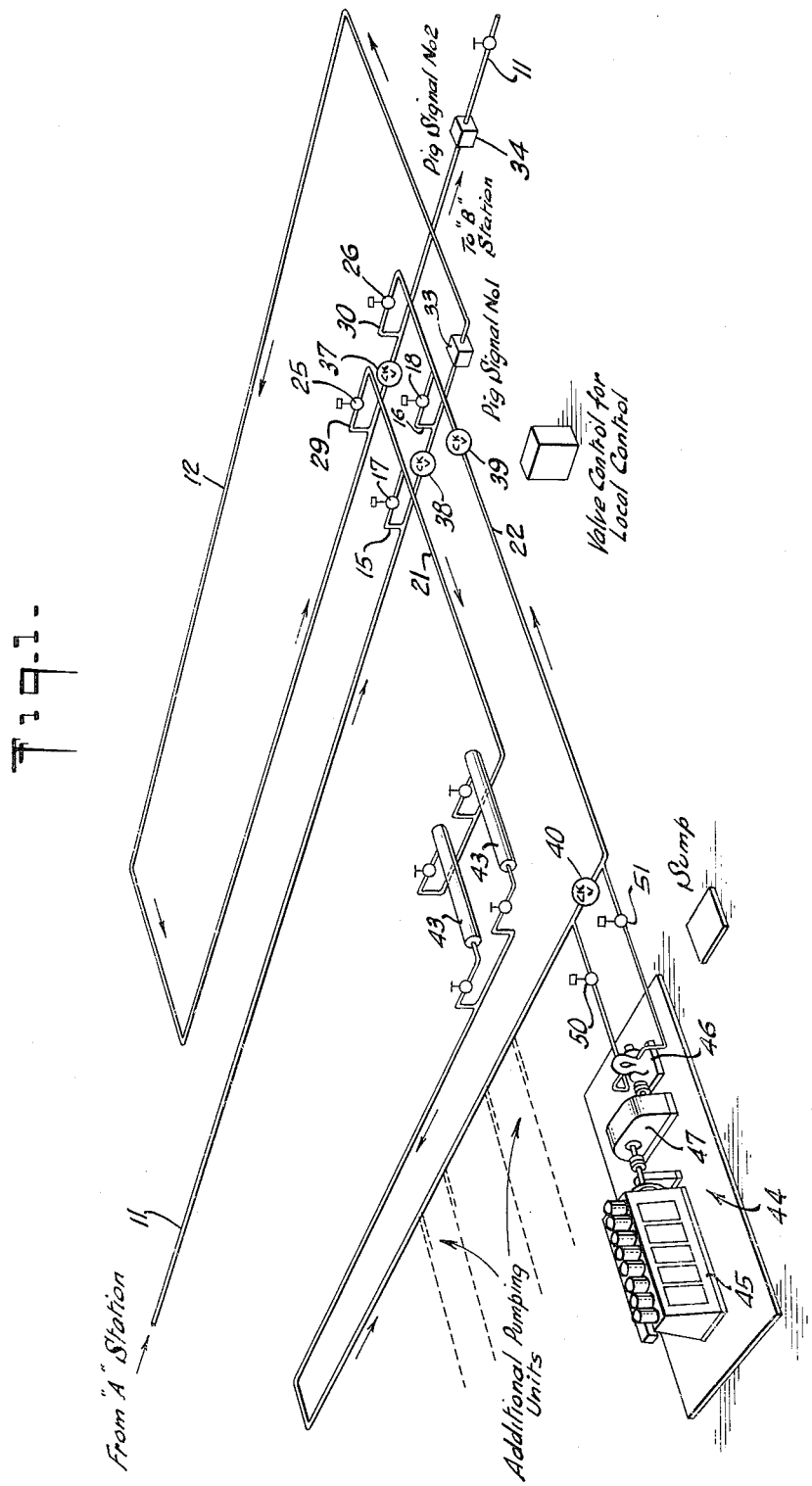
FIGURE 1 is a schematic perspective view showing an automatically operable pumping station as connected into a pipe line for carrying out the invention.

Referring to FIGURE 1, the elements of a pumping station and its connections into the pipe line along with the elements according to this invention, will be generally described. It is pointed out that in the particular embodiment of the invention that is being described there is illustrated an automatic booster station which requires no attendance unless some emergency situation arises. Thus, there is a pipe line 11 having an upstream end connected to station A (as indicated by the caption) while the downstream end thereof is connected to continue on toward a station B. Between the upstream and downstream portions of the pipe line 11, there is a loop 12 connected into the line and this will be ordinarily the same size pipe as is that of the main pipe line 11. Near the upstream end of loop 12 there are inlet and outlet connections 15 and 16 respectively, which lead to respective motor controlled valves 17 and 18. The valves 17 and 18 have the other side of each connected to a station inlet line 21 and a station outlet line 22 respectively.

Also connected to extensions of the station inlet and outlet lines 21 and 22 respectively, there is another pair of motor controlled valves 25 and 26. Valves 25 and 26 have connections from the other side of each via short inlet and outlet connections 29 and 30 respectively, to the downstream end of the loop 12 of pipe line 11.

It will be observed that there is also some additional equipment including a scraper signal indicator 33 (captioned Pig Signal No. 1) that is connected into the pipe line 11 near the upstream end of the loop 12. Similarly there is another scraper signal indicator 34 (captioned Pig Signal No. 2) connected into the pipe line 11 near the downstream end of the loop 12. Some auxiliary equipment that is employed in the system includes check valves 37 and 38 that are connected into the pipe line between alternative inlet and outlet connections that lead to the pumping station. It is also usual to include a check valve 39 in station outlet line 22 and another check valve 40 in the station line between inlet and outlet to prevent any undesired back flow or reverse action during the operation of the pumping station.

It will be observed that the pumping station has the station inlet and outlet lines 21 and 22 leading thereto from the alternative connections at either end of the loop 12. Of course the pumping station elements form no part per se of the invention, but included at the pumping station may be the usual equipment. This may include a plurality of heat exchange units 43 and a pumping drive unit 44. Drive unit 44, in turn, may include an engine 45 connected to a pump 46 via a speed-change drive coupling 47, all as illustrated. In addition there will be a pair of motor operated valves 50 and 51 for controlling the connection of pump 46 to the station inlet and outlet lines, in case of shut down or the like. It will be observed that there may be additional pumping units (not shown—but indicated) connected into the station inlet and outlet lines, as desired, in order to increase the pumping capacity of the station.

*Automatic operation*

The details of the automatic operation of the system will be made clear in connection with particular reference to FIGURE 2, where there is illustrated a schematic diagram of the pipe line 11 and loop 12 in addition to the station inlet connection 21 and station outlet connection 22. The electrical control system includes a pair of power supply terminals 61, for receiving a source of electrical power (not shown).

There is a pair of control circuits connected in parallel across terminals 61 that includes a first circuit controlled by the scraper signal indicator 33. This first circuit includes a circuit connection 62 that leads to a switch 63 which is operated mechanically by the scraper signal indicator 33. This electrical circuit continues from the other side of switch 63 via a connection 66 to a relay, or control operator 67, that acts to energize the operating motor of the valve 26 to drive the valve to its closed position. At the same time the circuit continues from relay 67 via a circuit connection 68 to another relay, or control operator 69, which is associated with the valve 25. Energization of relay 69 will act to cause the operating motor of valve 25 to run in the proper direction to close this valve. The circuit continues from relay 69 via a connection 72 to another relay, or control operator 73, which is associated with the valve 17. It will be noted that relay, or operator 73 is one which controls actuation of the operating motor to open valve 17. The circuit then continues from relay 73 via another circuit connection 74 to another "open" relay, or control operator 75 that controls the energization of the operating motor at valve 18 so as to open this valve. Finally, the first circuit is completed from relay 75 via a circuit connection 76 that leads back to the other one of terminals 61 to complete an electrical circuit for energizing the relays, or control operators; which were connected in series in that circuit.

Figure 2:
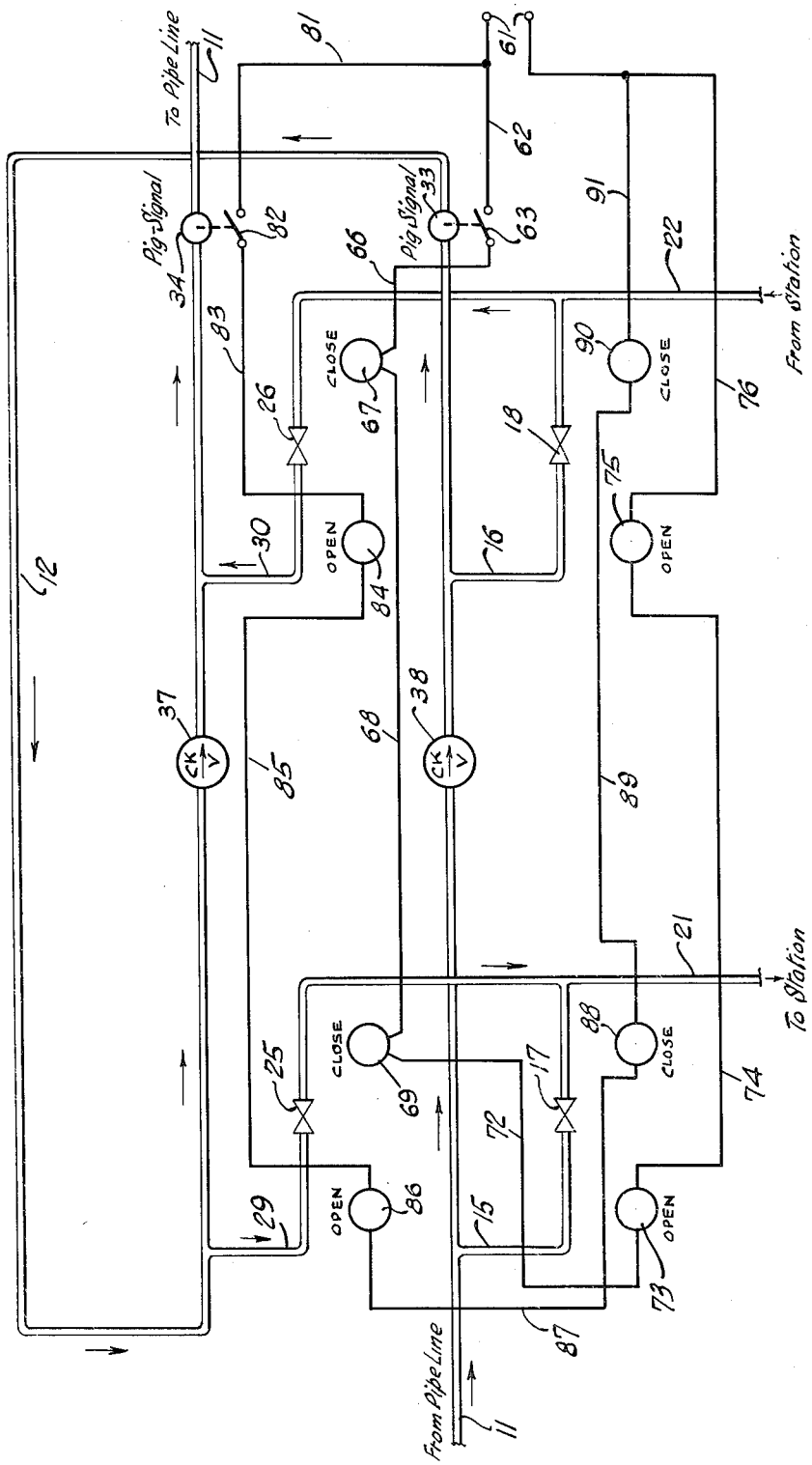
FIGURE 2 is a schematic diagram of the pipe line loop with connections to and from the pumping station, and including a schematic electrical circuit diagram showing the basic circuits for actuating the controls of the valves in the system.

It will be appreciated that the schematic circuit showing of FIGURE 2 is a simplified arrangement. And, as already indicated above, the various controller elements that are employed with the actuation of the motor for each of the motor-controlled valves, involves considerable additional equipment and complexity that is unnecessary to this description insofar as providing for the necessary understanding of the invention is concerned. Thus, it will be understood that when the scraper passes signal indicator 33 it momentarily closes switch 63 and this will energize the circuit including relays 67, 69, 73 and 75.

Then these relays will in each case actuate a holding circuit to energize and maintain the operation required to carry out a cycle of opening or closing action of each valve. This simultaneous opening and closing of valves 17, 18 and 25, 26 respectively, is carried out in accordance with predetermined timing arrangements for each valve. In other words, the operation will include energization of the motor drives for all four valves so as to shift the position of valves 25 and 26 from open to closed while at the same time shifting valves 17 and 18 from closed to open. These changes are actually carried out with the delay settings made so that valve 17 will commence opening a short while before valve 25 begins to close in order to provide for a continuing supply of pipe line fluid to the inlet of the pumping station. Similarly, after a predetermined time delay valve 18 will commence to open a short while before valve 26 begins to close, in order to transfer the outlet pressure from the pumping station from the downstream end of the loop to the upstream end behind the scraper.

The second of the pair of parallel electrical circuits connected to terminals 61 is for returning the valves to their original positions after the scraper has passed out of the loop and downstream along the pipe line. Thus, there is a circuit connection 81 that leads from the upper terminal 61 (as viewed in FIGURE 2) to a switch 82 that is controlled by the scraper signal indicator 34. The circuit continues over a connector 83 to an "open" relay, or control operator 84 that acts to control valve 26 for opening same. The circuit then continues from relay 84 over a circuit connector 85 to another relay, or control operator 86 and then over a connector 87 to a relay, or control operator 88 that controls the closing operation of valve 17. Then the circuit continues over a connector 89 to a relay, or control operator 90 that controls the closing of valve 18. Finally the circuit is completed via a connector 91 which leads back to the other (lower) terminal 61.

When the scraper passes signal indicator 34, it will cause momentary closing of switch 82 and the second circuit (just described) will be energized so that relays 84, 86 and 88, 90 will be actuated. These relays will control operation of the associated valves 26, 25 and 17, 18 respectively, to cause reverse action to take place so that the valves will be returned to the positions occupied before the scraper first reached signal indicator 33. Here again the changes will be carried out with delay settings. In this case the valve 26 will first commence opening a short while before the valve 18 begins to close; and after a predetermined (but shorter than in the first valve changes described above) time delay, the valve 25 will commence to open a short while before valve 17 begins to close.

FIGURE 4 illustrates a typical scraper signal indicator which is substantially like one that is commercially available and is manufactured by T. D. Williamson, Inc., of Tulsa, Oklahoma. For the purposes of understanding the operation and relating same to the system of this invention, it will be sufficient to note the following, as indicated by the structure illustrated in FIGURE 4. There is a trigger element 96 that extends into the pipe line 11 through a hole 97 in the pipe. The trigger 96 is supported on, and fixed firmly for rotation at all times with a shaft 98. Thus, the trigger 96 is bolted to the shaft 98 by two bolts 99, as illustrated. At one end of shaft 98 there is a cam 102 which is securely attached to the shaft 98 for rotation thereby and therewith. There is a cam follower 103 in spring biased contact with cam 102. Follower 103 acts to control actuation of a microswitch (not shown) located in a unit 104. On the other end of shaft 98, there may be an indicator arm 105 that provides visual indication of the position of trigger 96. At the same time there will be an electrical indication provided by the actuation of the microswitch in unit 104. The arrangement is such that trigger 96 is biased into its downward position (like that illustrated in FIGURE 4) so that following the passage of a scraper the trigger will be automatically reset so as to be ready to indicate again when another scraper passes. Consequently, the actuation of the microswitch in unit 104 will be of a relatively short duration, but as already indicated above, the valve control motor energization cycles that are commenced by the closing of the microswitch, merely need to be initiated and they will complete the opening and closing cycles irrespective of the position of the trigger and microswitch unit, following commencement thereof.

FIGURE 5 merely illustrates a typical check valve structure which will be employed in the indicated locations in the system, and which is so constructed as to allow passage of a scraper that takes up the full diameter of the pipe line through which the scraper is passing. Such a typical check valve 108 may be a commercial unit, e.g. one manufactured by Tom Wheatly Co. of Houston, Texas.

*Operation in general*

The operation of a typical system may be reviewed by following the action as a scraper arrives along pipe line 11. Reference may be had to FIGURES 1 and 2 primarily. Thus, when a scraper (not shown) arrives at the station it goes past the inlet connection 15, which is taken off at right angles to the line, and it passes on through the check valve 38. This check valve 38 will then be already at least partially open, depending upon the rate of flow of fluid in the line, because valves 17 and 18 are closed. If the check valve is not wide open, the scraper will merely contact the flapper of the valve and push it fully open as the scraper passes by (see FIGURE 5).

The scraper will then continue through the line and pass the signal indicator 33 which will therefore provide an electrical and a mechanical signal (see FIGURE 4 and explanation thereof). The electrical signal is that caused by switch 63 which is actuated by the signal indicator 33. Closing of this switch 63 provides a completion of the circuit that was described previously so that the relays 67, 69, 73 and 75 will be actuated and thus the valve-motor controls will be set in motion to close valves 25 and 26 while at the same time valves 17 and 18 will be opened. It will be observed that at the time this happens, the scraper still is located far enough upstream (the length of the loop 12) from the inlet connection to the pumping station so that none of the debris (including wax) preceding the scraper will be carried into the inlet to the pumping station.

As the foregoing action of closing and opening the indicated pairs of motor controlled valves takes place, the inlet and outlet connections via station lines 21 and 22 will be switched over from the downstream end of loop 12 in the pipe line (on either side of check valve 37) to the corresponding inlet and outlet connections for lines 21 and 22 that join the pipe line 11 at the upstream end of the loop 12 (on either side of check valve 38). Consequently, when the changeover of valve positions has been completed, the inlet line 21 will have been shifted from a connection to the pipe line via inlet connector 29 to a connection to the pipe line via inlet connector 15. Likewise, the outlet line 22 from the pumping station will have been shifted from outlet connector 30 to outlet connector 16. In this manner, the fluid being drawn into and out from the pumping station will have been switched over from a location well downstream of the location of the scraper, as detected or sensed by indicator 33, to a location upstream thereof.

The scraper will continue through the pipe line loop 12 and travel through check valve 37 to pass the other signal indicator 34, while carrying the scraper loosened debris mostly ahead of the scraper. As the scraper passes indicator 34 there will be similar action as when it passed the signal indicator 33. Thus, this time switch 82 of indicator 34 will be closed momentarily (and a mechanical signal will be provided) so that a circuit will be completed to energize the relays 84 and 86 as well as relays 88 and 90 which will all act to set in motion the opening and closing respectively of the pairs of valves 25–26 and 17–18. In this manner it will be clear that the motor controlled valves will then be returned to their original state such that valves 25 and 26 are open while valves 17 and 18 are closed. Consequently, this latter action will cause a switching back of the inlet and outlet connections (to the pumping station) from the upstream end of the loop 12 to the downstream end thereof. Thus, they are returned to the same condition as was the case prior to the arrival of the scraper adjacent to the pumping station.

It will be observed that by reason of use of a system according to this invention, the need for any personnel in attendance at the station in connection with the receipt and passage of a scraper, may be eliminated. In arrangements employed heretofore a scraper had to be directed into a special scraper receiving line or element from which it was necessary to manually transfer the scraper over to the downstream side of the line relative to the pumping station outlet.

It will be appreciated that a system in accordance with this invention may be arranged for pneumatic control of the various elements and the basic operation will remain unchanged. For example, the scraper signal indicator could provide a pilot valve actuation upon passage of a scraper, in place of the electrical microswitch action described above. Then, such pilot valve would provide a control signal for a pneumatic system that would be in general the same as the electrical control system which has been described. Consequently, the invention is applicable to a station where no electrical power is available since the indicated pneumatic control system might be provided, with the pneumatic power being generated as an auxiliary from the engine that drives the pump at the pumping station.

It will be appreciated that whereas the FIGURE 1 showing indicates right angle bends at the corners of the loop 12, these corners would, in fact, be sufficiently large radius curvature piping so as to allow free passage of the scraper without any danger of sticking.

The operation of both check valves 37 and 38 as well as the additional check valves 39 and 40 illustrated, will be clear from the foregoing explanations as well as from the knowledge of anyone skilled in the art. Thus, it is necessary to have a check valve between the inlet and outlet connections of the pumping station where they join the pipe line so as to provide effective pumping of the fluid in the pipe line without mere recirculation thereof. Similarly the use of check valve 39 is to avoid any back flow for any reason, which would tend to cause a reverse loading situation at the pump 46.

While preferred embodiments of the invention have been described above in considerable detail in accordance with the applicable statutes, this is not to be taken as in any way limiting the invention, but merely as being descriptive thereof.

I claim:
1. In pipeline operations involving a pumping station having a pump effectively connected to said pipeline, a system for automatically passing a scraper without subjecting said pump scraper accumulated debris, comprising in combination
    a loop connected into said pipeline at said station, said loop having sufficient length to accommodate all the debris plus enough clean fluid to effect switchovers,
    first means for effectively connecting said pump into the line at the downstream end of said loop,
    second means for effectively connecting said pump into the line at the upstream end of said loop,
    first scraper signal means located at the upstream end of said loop but effectively downstream from said second connecting means, second scraper signal means located at the downstream end of said loop and effectively downstream from said first connecting means, means controlled by said first signal means to switch the effective connection of said pump from the downstream to the upstream end of said loop, and means controlled by said second signal means to switch the effective connection of said pump back from the upstream to the downstream end of said loop.

2. The combination according to claim 1 wherein both of said first and second connecting means include as part thereof a pump input fluid line and pump output fluid line both extending between said pump and said pipeline, and wherein each said first and second connecting means comprises valve means for controlling connection of said pump input and pump output fluid lines into the pipeline.

3. The invention according to claim 2 wherein said valve means comprises a pair of motor driven valves for each of said pump input and said pump output fluid lines, and further including control means for said motor driven valves, said control means being actuated by said first and second scraper signal means.

4. An automatic pumping station for a pipeline, said station having a pump effectively connected to said pipeline and having means for passing a scraper without flowing any scraper debris through the pump, comprising a pipeline having a loop adjacent to said station, a branched inlet line to said pump, a branched outlet line from said pump, a first pair of motor driven valves having one side of each connected to branches of said inlet line, the other side of each of said first pair of valves being connected to said pipeline near the upstream and near the downstream end respectively of said loop, a second pair of motor driven valves having one side of each connected to branches of said outlet line, the other side of each of said second pair of valves being connected to said pipeline near the upstream and near the downstream end respectively of said loop, a first signal indicator located near the upstream end of said loop but effectively downstream from the upstream loop connections to said first and second pair of valves in said pipeline for detecting passage of a scraper, a second signal indicator located near the downstream end of said loop and effectively downstream from the downstream loop connections to said first and second pair of valves for detecting passage of the scraper, and control means actuated by said signal indicators for causing the corresponding one of each of said first and second pair of valves to open and the other of each pair to close in order to shift both said inlet and outlet lines from a downstream location relative to said scraper to an upstream location relative to said scraper.

5. An automatic pumping station according to claim 4 wherein said control means also causes the corresponding ones of said pairs of valves to be operated to the reverse state thereof following passage of the scraper past said second indicator in order to return the system to the original conditions ready to pass another scraper.

6. An automatic pumping station according to claim 5 further including first and second check valves located in the pipeline between the other sides of corresponding ones of said pairs of valves in order to effectively connect the pump into the pipeline while also providing for passage of the scraper therethrough.

References Cited by the Examiner

UNITED STATES PATENTS

| | | | |
|---|---|---|---|
| 2,151,671 | 3/39 | Wright | 134—8 |
| 2,729,839 | 1/56 | Holt | 15—104.06 |
| 2,953,157 | 9/60 | Osborne et al. | 15—104.06 |
| 2,965,125 | 12/60 | Osborne et al. | 15—104.06 |
| 3,072,503 | 1/63 | Baum | 134—8 |
| 3,116,503 | 1/64 | Bagwell | 15—104.06 |

CHARLES A. WILLMUTH, *Primary Examiner.*